3,468,837
SOLUBLE, HIGH MELTING DICYLOPENTADIENE POLYMER TYPE RESIN, ITS PROCESS OF MANUFACTURE AND ITS USE IN COMPOSITIONS SUCH AS PRINTING INKS

Harvey B. Wheeler, Pittsburgh, and Eugene P. D'Amico, Bentleyville, Pa., assignors to Neville Chemical Company, Pittsburgh, Pa., a corporation of Pennsylvania
No Drawing. Filed July 26, 1967, Ser. No. 656,033
Int. Cl. C08f 15/42, 1/02; C09d 11/10
U.S. Cl. 260—33.6         6 Claims

ABSTRACT OF THE DISCLOSURE

A new hydrocarbon resin is made by polymerizing a particular kind of cracked petroleum fraction in admixture with a small proportion of a terpene, notably alpha-pinene. It is of particular value in printing inks but its good solubility and high melt point make it also useful in a variety of other applications, notably in the formulation of hot melt adhesives. The resin has a high melting point and yet is soluble in solvents of low Kauri Butanol value such as are required by the printing ink industry for gravure and heat set inks. Its solution viscosity characteristics and solvent release properties compare favorably to modified rosins classically used in gravure and heat set inks. It contributes to gloss and rub resistance of ink and because of its neutrality does not react with sensitive pigments.

BACKGROUND OF THE INVENTION

Printing ink is a colored fluid or paste composition capable of being deposited in thin films which reproduce a desired image by any one of several printing processes. A printing ink usually consists of one or more pigments dispersed in a vehicle which contains an organic polymer or film former designated as the binder. The composition of printing inks varies widely depending upon the printing method to be employed, the specific type of printing press and press speed, the surface to be printed, and conditions to which the printed matter is to be subjected during use. Thus, the vehicle can consist of vegetable or synthetic drying oils, lithographic varnishes such as heat bodied linseed oil, pitch varnishes and resin solutions. The resin solutions can be solutions of resins in inert solvent, or solutions of resins in conjunction with natural or synthetic drying oils, etc. A printing ink must possess suitable physical characteristics such as viscosity, length, flow, and tack to adapt it to the particular type of printing press and stock on which it is to be used.

Printing inks are usually divided into three main classes corresponding to the three major divisions of printing: typographic (letter press), planographic or lithographic, and intaglio. Typographic inks generally consist of soft pigments ground in a varnish or vehicle composed essentially of heat bodied linseed oil or synthetic resins dispersed in drying oils. The surface on which they are printed is generally non-absorbent and therefore these inks usually dry by oxidation of the vehicle. They are printed from raised or relief surfaces such as ordinary type.

Planographic inks are used to print from plain surfaces and are generally heavier and shorter, i.e., they are more viscous and have a higher yield value, than similar typographic inks. The pigments and vehicles used in these inks must not be affected by water since in this process the printing areas of the transfer surface are wet by the ink while the non-printing areas are kept water wet and ink-repellent.

Intaglio inks are used to print from engraved or depressed surfaces. Their character depends somewhat on the kind of plate, the type of press being used, and the speed of operation. For example, hand printing of fine engravings requires an ink which will dry by oxidation and which possesses a short buttery consistency. At the other extreme are intaglio inks which are used to print from engraved copper rolls at high speed. Here the ink dries mainly by absorption and evaporation and must be very thin and consist of low gravity pigments dispersed thoroughly in a very fluid vehicle which contains little or no drying oil.

The present invention is particularly concerned with resins for intaglio inks and for heat set inks which dry by evaporation of the volatile portions of the vehicle. In gravure inks, the solvents evaporate at room temperature whereas in the so-called heat set or flash dry inks heat is employed to drive off the solvents. In both cases, resins of high melting points are desirable so as to reduce the probability of the printed sheets sticking together on the rolls or plies and to minimize transfer of ink from one copy to another.

Petroleum hydrocarbon resins have been used in various kinds of printing inks. However, in gravure and heat set inks which dry by a combination of absorption and solvent evaporation, their use has heretofore been severely limited by their generally poor solvent release characteristics. Gravure inks are generally thin and non-oily. Their viscosity range is generally from 100 to 300 centipoise, and they are ideal for mixing in a ball mill which is a cheap one-stage process in comparison with other processes which require preliminary mixing and subsequent more complete dispersion by three-roller milling. These particular type of inks are often extended with whiting, china clay or other cheap fillers.

Heat set inks are most often formulated for letter press machines. The consistency of these inks can range from being very thick down to about 500 centipoise viscosity, which is suitable for high speed rotary presses. The bulk of weekly periodicals and magazines, for example, is printed in heat set ink. In commercial operation, heat set inks are dried by solvent evaporation. For instance, such an ink should dry in about 4 seconds at 180° C., which is about the highest usable temperature, or in 10 seconds at about 150° C. Unless the resin has a sufficiently high melting point, serious difficulties result in such an operation. But previously made hydrocarbon resins having a satisfactorily high melting point have generally been too cross-linked to have good solubility in aliphatic solvents. Heat set inks are often printed on heavy absorbent paper which helps the drying. The inks generally contain a high proportion of saturated aliphatic solvent but little or no drying oil. The solvents used must have a narrow boiling range, encompassing a span of not more than about 20° or at the most 50° C., a reasonably high boiling point, e.g., between about 200° and 300° C., a relatively low vapor pressure at room temperature, and a much higher vapor pressure at the drying temperature to permit rapid evaporation when the print is being set by heating. The resins selected for heat set and gravure inks must be soluble in the solvent used, must have good wetting for pigments, and give hard, durable, flexible films. They must release the solvent rapidly and completely at the drying temperature. Typical resins used for heat set and gravure inks are limed hardened rosin, phenolics in combination with limed hardened rosin, pure or modified phenolics, rosin maleic esters and, of course, hydrocarbon resins which are of principal concern here.

Hydrocarbon resins can be made relatively inexpensively from various cracked petroleum fractions and have the advantage of being essentially neutral, thereby being suitable for use in combination with a wide variety of colorants. On the other hand, hydrocarbon resins having the required high melt point often lack the required solubility in the type of solvents used in printing inks, they tend to produce vehicles which do not wet pigments satisfactorily (particularly if they are low unsaturation resins made from fractions rich in aromatic olefins such as styrene, styrene homologs and indene) and on the other hand often have poor storage stability when made from feed stocks that produce a resin with substantial unsaturation. Odor also often is a problem.

SUMMARY OF INVENTION

It has now been discovered that an exceptionally good hydrocarbon resin for use in printing inks, and particularly in heat set printing inks, can be made by polymerizing a selected cracked petroleum fraction in admixture with a minor proportion of a terpene, notably alpha-pinene. Thermal copolymerization is particularly preferred.

DESCRIPTION OF INVENTION

In making the hydrocarbon resins in accordance with the present invention a polymerization mixture is made up consisting essentially of 75% to 95% of a severely cracked petroleum fraction boiling in the heavy naphtha or light gas oil boiling range as hereinafter more fully described and correspondingly about 25% to 5% of alpha-pinene. Inclusion of less than 5% of alpha-pinene in the polymerization mixture results in a resin lacking the desired degree of solubility and stability at elevated temperature whereas the inclusion of too much of the terpene in the polymerization mixture results in a drastic reduction in obtainable polymer yield. The polymerization is advantageously effected by heating the polymerizable feed mixture to a temperature between about 210° and 290° C., preferably between about 230° and about 265° C., and holding it at such a temperature until the desired conversion is obtained.

After venting the polymerization kettle, the mixture is steam stripped in the reaction vessel or it can otherwise be distilled to obtain a product having the desired softening point. For convenience in eventual use, the stripped polymerized mixture can be flaked by pumping it in the molten state at an elevated temperature, e.g., between about 200° and 260° C., to a flaker and there converting it into a flaked solid resin. To achieve the desired product properties and yield, it is preferred to use a feed mixture which contained no diluent other than the minor proportion of unpolymerizable components contained in the cracked petroleum fraction which constitutes the principal portion of the polymerizable charge. Generally speaking, a reaction mixture thus should contain less than about 25% and preferably less than 15% of vinyl aromatic hydrocarbons. A conversion of at least about 60% and preferably at least 65% and up to about 90% or 95% based on total hydrocarbon charged to the polymerization is representative of a good operation in accordance with the present invention.

Unsaturated hydrocarbon fractions suitable for copolymerization in accordance with the present invention can be obtained from a variety of processes, for instance, from steam cracking or thermal cracking of normally gaseous hydrocarbon feeds such as ethane or propane or mixtures of two or more hydrocarbons having 2 to 4 carbon atoms per molecule. Particularly useful are cracked petroleum fractions which boil essentially in the range between about 140° and about 250° C. The specific gravity of such unsaturated feed fractions (15.6°/15.6° C.) usually is between about 0.93 and 0.99, and their iodine number usually is between about 120 and 300 and preferably between about 250 and 300. Particularly desirable are unsaturated hydrocarbon fractions rich in hydrocarbons of the dicyclopentadiene series having a boiling range such that not more than about 5% of the fraction boils below 150° C. and not more than 5% of the fraction boils above 250° C. The mixed aniline point of such fractions typically is in the range between about 12° and 30° C., e.g., between about 15° and 25° C.

Such fractions contain, for instance, from about 70% to 90%, preferably from about 75% to 90%, of polymerizable $C_8$–$C_{12}$ and particularly $C_9$–$C_{11}$ unsaturated hydrocarbons such as the various dimers and codimers of cyclopentadiene and methylcyclopentadiene as well as a relatively small amount, usually less than 10%, of polymerizable aromatic hydrocarbons such as styrene and indene. The essentially unpolymerizable part of the fraction usually consists of aromatics such as toluene, xylene, ethylbenzene and naphthalene, and such hydrocarbons should amount to less than 20%, preferably less than 15%, of the fraction. It is particularly preferred to use fractions wherein dicyclopentadiene constitutes the major portion of the polymerizable components and which also contain significant amounts of methyldicyclopentadiene, the codimer of cyclopentadiene and butadiene and the codimer of cyclopentadiene and isoprene.

Alpha-pinene, though it is generally known to give low resin yields and softening points when polymerized by itself, is the preferred terpene used as the second important component of the polymerizable feed in the present invention. It can be used in any of its commercially available forms such as gum spirits of turpentine or refined sulfate wood turpentine. Such commerical turpentines commonly contain at least 60% alpha-pinene and are available in forms which contain more than 80% alpha-pinene, the balance being principally beta-pinene. Most preferably, the pinene feed stock used herein contains at least 85% alpha-pinene. A particularly good feed stock is commercial alpha-pinene containing about 90% to 99% alpha-pinene, about 1% to 6% beta-pinene and 0% to about 4% of associated monocyclic or bicyclic terpenes such as camphene. It distills within the range of from 150° to 160° C. (vapor temperature) and has an aniline point by the standard ASTM D–611 method of about 26° C. Beta-pinene may also be used in the present invention to make polymer resin of good quality.

The resin produced is light colored, highly soluble in solvents having a Kauri Butanol value between about 30 and 35, has a melting point above about 170° and below about 200° C. and a relatively low unsaturation corresponding to an iodine number of between about 120 and 140 (ASTM D–1959, Wijs). By contrast, a similar resin prepared in the absence of the terpene has an iodine number above 145, poor solubility in aliphatic solvents and greater sensitivity to heat. Of course, if oxidized all such resins undergo a decrease in unsaturation and solubility.

To be used in printing, the resins of this invention are dissolved with an appropriate solvent and carbon black or other desired colorant and other conventional ingredients such as solid extenders, auxiliary polymeric binders and other functional organic or inorganic compounds may be included in the vehicle which is composed of resin dissolved in a hydrocarbon solvent which is usually aliphatic in nature. The preferred solvents for heat set inks are highly refined hydrocarbon oils which are relatively high boiling and boil within a relatively narrow range, e.g., between about 230° and 330° C. Particularly preferred are essentially aliphatic solvents which have a boiling range that does not extend over more than about a 50° C. interval, e.g., between about 250° and about 300° C., and which have a Kauri Butanol value of less than about 40° C. and preferably less than 35° C. (as compared to a value of 105 for toluene). In making up an ink composition, the hydrocarbon resin and carbon black or other pigment in powder form may be placed in a ball mill together with the solvent and mixed until a uniform dispersion of the pigment in the hydrocarbon solution is obtained. If desired, it is possible to prepare an ink concentrate in this fashion which is only subsequently diluted with additional solvent to the concentration appropriate for use in the printing operation. Typically, for instance, an ink composition used in a printing operation may contain between about 10% and about 50% of the resin, between about 100 to 200 parts of carbon black or other pigment or colorant per 100 parts of resin, the balance consisting essentially of an aliphatic hydrocarbon solvent.

The invention will next be illustrated in terms of specific examples. In these examples, as well as in the other parts of the present specification and appended claims, it should be understood that all amounts and proportions of materials are expressed on a weight basis unless otherwise indicated.

EXAMPLES

A series of three runs was made to show how resins made by polymerizing a dicyclopentadiene type cracked hydrocarbon fraction in the presence of pinene in accordance with the present invention compare with a similar resin made in the absence of pinene.

In each of these runs the cracked hydrocarbon fraction, and the pinene feed when used, were dried by percolation through 20–40 mesh anhydrous calcium sulfate. After drying, 750 ml. of total charge was placed in a 1-liter polymerization autoclave which was equipped with a thermometer. The bomb was gradually heated over a 2-hour period by electric heaters to raise the temperature of the contents to 245° C. and the temperature was then held between 245° and 250° C. for 16 hours. Thereafter the autoclave was removed from the heaters, cooled to ambient temperature (about 25° C.) and the residual pressure was vented.

The autoclave and contents were then warmed to 125°–150° C. to facilitate transferring the polymerized oil for distillation to a 3-neck glass flask of 1-liter capacity. The flask was equipped with a thermometer, a steam inlet tube and an adapter connected to a condenser assembly. The polymerized oil was heated in the flask to 240° C. whereupon super-heated steam at 190°–200° C. was introduced and the polymerized oil was steam distilled until a resinous residue having a Ring-and-Ball softening point of between 170° and 175° C. (ASTM-E-28) was obtained.

Periodic determinations were made on representative portions of the flask contents while the stripping was in progress to determine when the desired product was obtained. The resin was then placed in a shallow aluminum foil dish, allowed to solidify, the resin properties were determined on the resin after it reached ambient temperature.

The unsaturated hydrocarbon fraction used in these runs was a commercial cracked hydrocarbon fraction referred to hereafter as "CHF," having the composition and properties set forth in Table A below.

TABLE A.—CRACKED HYDROCARBON FRACTION ("CHF")

| Composition: | Weight percent |
|---|---|
| Benzene | 0.1 |
| Toluene | 3.7 |
| Xylene and ethylbenzene | 5.1 |
| Naphthalene | 0.5 |
| Styrene | 5.6 |
| Indene | 1.7 |
| Butadiene-cyclopentadiene codimer | 6.0 |
| Isoprene-cyclopentadiene codimer | 2.0 |
| Dicyclopentadiene | 46.6 |
| Methyldicyclopentadiene | 14.0 |
| Dimethyldicyclopentadiene | 0.8 |
| Intermediate polymers | 6.4 |
| Unidentified | 7.5 |
| Specific gravity at 15.6° C. | 0.973 |
| Engler distillation, °C.: | |
| 5% off | 150 |
| 95% off | 235 |
| Polymerizable hydrocarbon content | About 80 |
| Color, Gardner | 6 |
| Iodine number | 270 |
| Mixed aniline point | 20.7 |

The alpha-pinene used in these runs was a commercial product, referred to hereafter as "AP," which had the composition and properties set forth in Table B.

TABLE B.—ALPHA-PINENE FEED STOCK ("AP")

| Composition: | Weight percent |
|---|---|
| Alpha pinene | 93.5–95 |
| Beta-pinene | 2.5–4 |
| Camphene (substantially) | Balance |
| Color, Gardner | Less than 1 |
| Specific gravity at 15.6° C. | 0.860–0.864 |
| Refractive index at 25° C. | 1.463–1.467 |

"Magie 470" was used as the aliphatic hydrocarbon solvent in making up an ink vehicle in the foregoing example. The characteristics of this solvent are set forth in Table C below.

TABLE C.—"MAGIE 470" INK SOLVENT

| | Weight percent |
|---|---|
| Specific gravity at 15.6° C. | 0.832 |
| Engler distillation, 0° C.: | |
| I.B.P. | 256 |
| 50% | 270 |
| End point | 303 |
| Kauri butanol value | 31.2 |

The three polymerizations are summarized in Table D.

TABLE D.—COMPARATIVE POLYMERIZATIONS

| | Run No. | | |
|---|---|---|---|
| | 1 (Prior art) | 2 (Invention) | 3 (Invention) |
| Charge composition: | | | |
| "CHF", parts | 100 | 90 | 80 |
| "AP", parts | | 10 | 20 |
| Resin properties: | | | |
| Yield, percent | 83.0 | 77.0 | 67.0 |
| Soft point (R&B) ° C | 175 | 175 | 170 |
| Color, Neville meter | 1.2 | 1.5 | 1.7 |
| Stoddard solubility, ° C | +12/+2 | +9/−35 | <−60 |
| Iodine number | 158 | 133 | ? |

Stoddard solubility was determined by dissolving 5 grams of resin in 20 grams of Stoddard solvent, the solvent having been carefully adjusted by the addition of xylene to give a straight aniline point (ASTM-D-611) of 61.3±0.1° C. The mixture is heated until it becomes clear or the boiling point of the solvent is reached (135 to 140° C.). The Stoddard solubility is expressed in two values, the first being the temperature at which incipient clouding appears when the hot sample solution is gradually cooled and the second being the temperature at which a definite cloud appears.

The iodine number was determined according to ASTM D–1959 (Wijs).

The average molecular weight of all three resins was between about 940 and 1010.

50—50 solutions of the three resins in "Magie 470" aliphatic hydrocarbon solvent had Gardner viscosities between $Z_3$ and $Z_4$.

In similar polymerization runs it was noted that when the polymerized mixture was insufficiently stripped such that the resinous product had a lower softening point, e.g., 170° C., print produced from such a resin was distinctly less glossy and therefore less desirable.

On the other hand, in Run No. 1 and in other runs wherein no pinene or an insufficient amount thereof was included in the polymerization charge, the polymerized mixture tended to be excessively sensitive to or unstable at elevated temperatures in the sense that after the polymerizable components of the feed were converted into a resin of the desired characteristics, e.g., a softening point between 175° and 180° C. after stripping, the softening point of the resulting polymer tended to creed up substantially while the polymerized mixture was at an elevated temperature either prior to being removed from the kettle or during subsequent processing. As a consequence the resulting resin as finally recovered in commercial scale operations often wound up having a softening point in excess of 200° and often as high as 220° C. or more and its nature was consequently such that it was insufficiently soluble in the type of high boiling aliphatic hydrocarbon solvents required in printing inks. Specifically, where the softening point of the resins made in accordance with this invention should not increase more than 15° C., and in preferred embodiments less than 10° C., when heated in air for six hours at 250° C., the softening point of similar resins made without the use of terpene in the polymerization feed increases more than 30° C. and often as much as 50° C. when similarly heated and becomes insoluble in aliphatic solvents.

In some instances where the resin or the ink composition made therefrom or the ultimate print are expected to be at an elevated temperature over extended periods, or where it is particularly important to keep post-polymerization changes such as increases in resin softening point down to a minimum, it is advantageous to include a small amount of an antioxidant in the resin. For instance, between about 0.1 and 3%, or typically about 0.5% of a conventional phenolic or amine type antioxidant may be included in the hot molten resin prior to flaking it. Among suitable phenolic antioxidants 2,2′-methylene-bis(4-methyl-6-tertiary butyl phenol), butylated octyl phenol and 2,6-ditertiary butyl-4-methyl phenol may be named as being representative of this type of compound useful herein.

For instance, while the softening point of the resin from Run No. 2 is increased about 10° C. when heated in air for six hours at 250° C., upon inclusion of 0.5% of 2,6-ditertiary butyl-4-methyl phenol in this same resin while in its original molten condition its ultimate softening point is increased only about 3° C. when similarly heated.

If light resin color is not particularly important, amine type antioxidants such as phenyl-beta-naphthylamine, di-octyl-diphenyl amine, N-phenyl-2-naphthylamine or N,N′-diphenyl-p-phenylene-diamine may be used.

The foregoing description and examples have been given so as to illustrate, but not necessarily to limit, the nature and scope of the present invention. The scope of the invention which is to be protected is particularly pointed out in the appended claims.

We claim:
1. A thermoplastic polymeric hydrocarbon resin which consists essentially of a polymerized mixture of:
  (a) from about 75% to 95% of a cracked petroleum fraction boiling essentially between about 150° and about 250° C., having a specific gravity between about 0.93 and 0.99 and an iodine number between about 120 and 300, containing from about 70% to about 90% of polymerizable $C_8$ to $C_{12}$ cyclic olefins the major part of which are dicyclopentadiene and codimers of cyclopentadiene with butadiene, isoprene and methylcyclopentadiene and only the minor part of which are styrene and indene; and (b) correspondingly from about 5% to 25% of alpha-pinene; said resin having a Ring-and-Ball softening point above about 170° C. and below about 200° C. and an iodine number between about 120 and 140, and being soluble in hydrocarbon solvents which boil between 200° and 300° C. and have a Kauri butanol value of not more than 35.

2. A polymeric hydrocarbon resin as defined in claim 1 containing 0.1% to 3% of a phenolic antioxidant dispersed therein and characterized by thermal stability such that on heating in air at 250° C. for six hours the softening point of the resin increases less than 10° C.

3. A vehicle for printing ink which comprises a solution of the resin of claim 1 dissolved in an aliphatic hydrocarbon solvent which boils between about 250° and 300° C. and has a Kauri butanol value between about 30 and 35.

4. A printing ink composition comprising about 10 to 50 parts of resin as defined in claim 1 in solution in 100 parts of an aliphatic hydrocarbon solvent which boils between about 250° and 300° C. and has a Kauri butanol value between about 30 and 35, and about 10 to 25 parts of a powdered pigment dispersed in said solution.

5. A process for non-catalytically making a thermoplastic hydrocarbon resin which is soluble in aliphatic hydrocarbon solvents, which process comprises mixing about 80 to 95 parts of a cracked petroleum fraction boiling essentially between about 140° and about 250° C., having a specific gravity between about 0.93 and 0.99 and an iodine number between about 120 and 300, containing from about 70% to about 90% of polymerizable $C_8$ to $C_{12}$ cyclic olefins the major part of which are dicyclopentadiene and codimers of cyclopentadiene with butadiene, isoprene and methylcyclopentadiene and only the minor part of which are styrene and indene with correspondingly about 5 to 20 parts of alpha-pinene, heating the resulting mixture to a temperature between about 210° and 290° C., maintaining the mixture within this temperature until a conversion of at least 60% of the hydrocarbon charged is obtained, stripping the polymerized mixture to produce a residue having a Ring-and-Ball softening point at least about 170° C. and not more than about 200° C., and cooling said residue to obtain a solid resin.

6. A process according to claim 5 wherein the hydrocarbon mixture is kept from substantial contact with oxygen when at a temperature above about 150° C. and wherein said residue after stripping is flaked before it is cooled to become solid.

References Cited
UNITED STATES PATENTS

| | | | |
|---|---|---|---|
| 2,567,918 | 9/1951 | Burroughs | 260—93.3 |
| 2,568,216 | 9/1951 | Burroughs | 260—93.3 |

MORRIS LIEBMAN, Primary Examiner

SAMUEL L. FOX, Assistant Examiner

U.S. Cl. X.R.
260—82, 88.2